April 28, 1953     J. K. MERTZWEILER     2,636,903
SYNTHESIS OF OXYGENATED ORGANIC COMPOUNDS
Filed Oct. 20, 1949
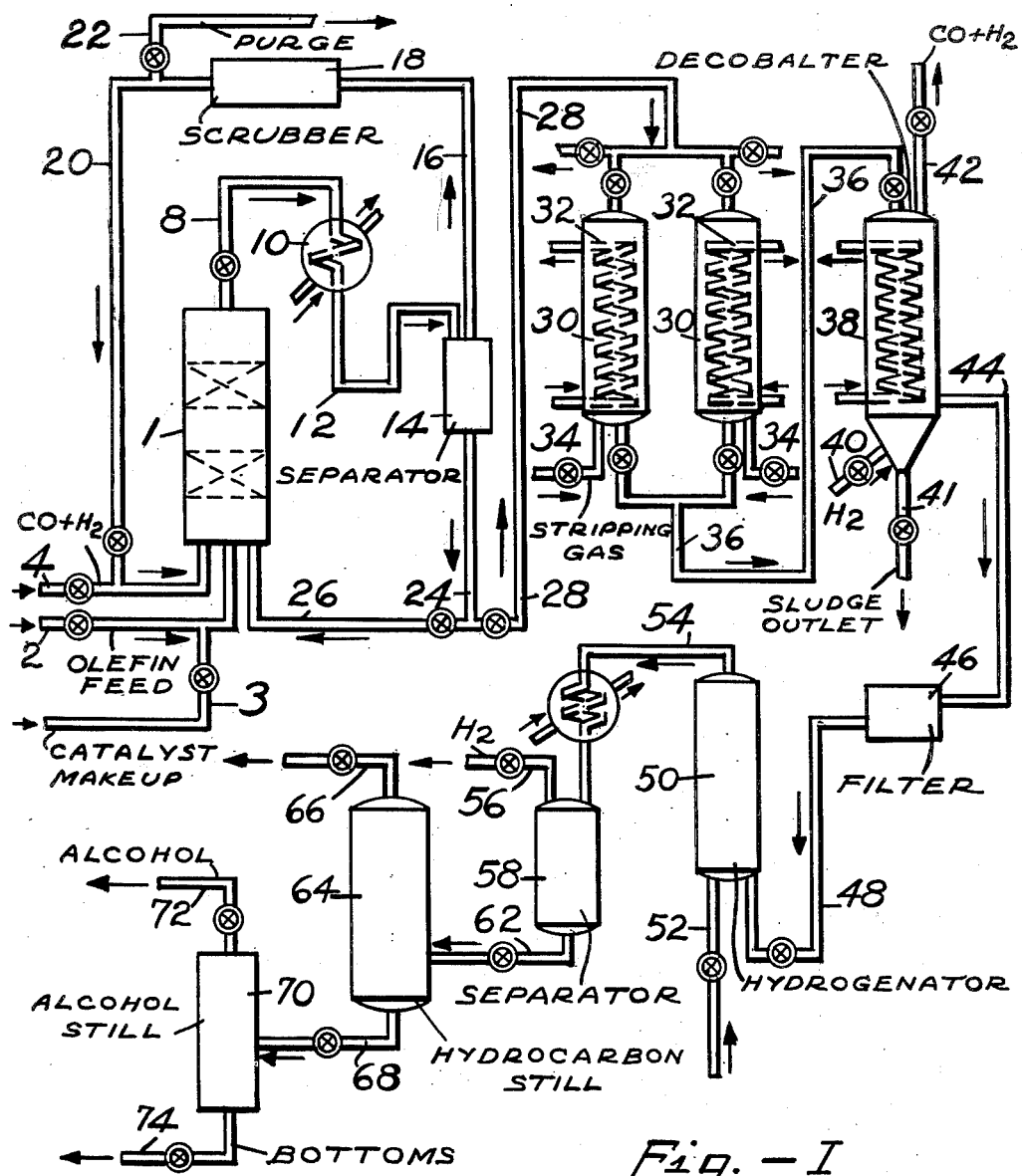
Fig. - I
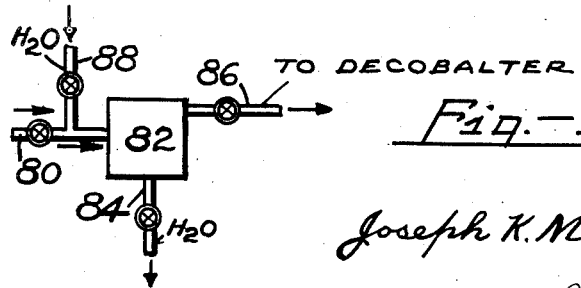
Fig. - II
Joseph K. Mertzweiler Inventor
By J. Cashman Attorney Patented Apr. 28, 1953

2,636,903

UNITED STATES PATENT OFFICE 2,636,903

SYNTHESIS OF OXYGENATED ORGANIC COMPOUNDS

Joseph K. Mertzweiller, Baton Rouge, La., assignor to Standard Oil Development Company, a corporation of Delaware Application October 20, 1949, Serial No. 122,374

6 Claims. (Cl. 260—604)

The present invention relates to the preparation of oxygenated organic compounds by the reaction of olefinic carbon compounds with hydrogen and carbon monoxide in the presence of a carbonylation catalyst. More specifically, this invention relates to an improved process for removing catalytic material from the reaction products resulting from the interaction of these reactants.

It is now well known in the art that oxygenated organic compounds may be synthesized from olefinic organic compounds by reaction of the latter with carbon monoxide and hydrogen in the presence of a catalyst containing cobalt or iron or other carbonylation catalyst in an essentially three-stage process. In the first stage the olefinic material, catalyst, and synthesis gases are reacted under pressure to give a product consisting predominantly of aldehydes containing one more carbon atom than the olefinic material, as well as a certain amount of secondary reaction products, polymeric material, etc. This oxygenated organic mixture, which contains in solution, compounds of the metal catalyst, may be treated in a second stage with heat to cause decomposition and removal of the soluble catalytic material from the organic mixture. The catalyst-free material may then be hydrogenated in a hydrogenation stage to the corresponding alcohol, or it may be oxidized to the corresponding carboxylic acid.

This carbonylation reaction provides a particularly attractive method for the preparation of valuable primary alcohols, which find large outlets, particularly as intermediates for plasticizers, detergents, and solvents. Not only long and short chained olefin hydrocarbons, but also, most other types of organic compounds containing at least one olefinic double linkage, such as unsaturated acids, esters, alcohols, ketones, etc., are susceptible to this type of reaction.

The catalyst for the first stage of the reaction, where olefinic material is converted into aldehyde, is usually added in the form of salts of the catalytically active metal with high molecular weight organic acids, such as oleic, stearic, naphthenic, etc. Examples of such catalyst salts or soaps are cobalt or iron oleate, stearate, naphthenate and the like. These salts are soluble in the liquid olefin or olefin-paraffin feed, and may be supplied to the first stage as dissolved in the feed or as hydrocarbon solution.

As the synthesis gases are consumed at equivalent or equimolar rates, synthesis gas components are usually added at equimolar proportions of $H_2$ and $CO$, though it has been suggested to use both an excess of hydrogen and an excess of $CO$. The conditions for reacting olefinic compounds with hydrogen and carbon monoxide vary somewhat in accordance with the nature of the olefinic feed, but the reaction is generally conducted at pressures of about 3000 pounds per square inch and at temperatures in the range of about 200°–450° F. The ratio of synthesis gas feed to olefin may vary widely; in general, about 1000–15,000 cubic feet of $H_2+CO$ per barrel of olefin feed are employed.

At the end of the first stage, when the desired conversion of olefins to oxygenated compounds has been effected, the products and the unreacted material are generally withdrawn to a catalyst removal zone, where dissolved catalyst is removed from the mixture, and it is to this stage that the present invention applies.

One of the major problems involved in the aldehyde synthesis reaction is the fact that the catalyst metal and other carbonyl forming metals such as cobalt, iron, etc., though added as organic salts to the reaction zone, react with carbon monoxide under the synthesis conditions to form metal carbonyls. There is basis for the belief that the metal carbonyl or hydrocarbonyl is the active form of a catalyst. The carbonyl remaining dissolved in the reaction product from the primary carbonylation stage must thus be removed in an intermediate catalyst removal stage and this is customarily done by heating the primary reaction product in a suitable chamber or tower with or without packing at atmospheric or superatmospheric pressures and usually in the presence of a slow stream of an inert stripping gas such as hydrogen in order to remove overhead the carbon monoxide resulting from the decomposition of the metal carbonyl to protect the nickel or cobalt or other carbonyl forming metal employed in the subsequent high pressure hydrogenation stage. This process is quite satisfactory as far as removing the cobalt carbonyl is concerned by decomposing the latter into metallic cobalt and carbon monoxide, though small quantities of other metallic carbonyls, in particular, iron carbonyl, are not completely removed by this process. Iron carbonyl may arise from various sources such as from the interaction of carbon monoxide at high pressures with iron containing impurities in the feed, reaction of carbon monoxide with the walls of the reactor and and transfer lines, reactor packing, and the like. Iron carbonyl is considerably more stable than the cobalt analogue and thus, while the latter is decomposed under decobalting conditions in the catalyst removal zone, iron carbonyl may only be partially decomposed. Furthermore, it has been found that other cobalt compounds, not specifically added as catalysts, in particular cobalt formate, may be present in as much as 0.5% of the effluent from the decobalting zone. These compounds are not readily decomposed by heat in the presence of an inert gas such as hydrogen. It is highly undesirable for soluble metal to be present in the product leaving the catalyst removal zone because of the tendency for the metal to decompose under the more severe conditions obtaining in the hydrogenation zone and in the preceding heating coils, resulting in plugged lines and also deactivation of the hydrogenation catalyst. Accordingly, it is highly desirable to keep the total cobalt concentration less than about 0.005% in the effluent from the catalyst removal zone.

It is one of the purposes of the present invention to provide improved means for removing cobalt and other carbonyl-forming metals from the carbonylation reaction product and to prevent plugging of reactor lines and deactivation of the hydrogenation catalyst.

Other and further objects and advantages of the invention will become apparent from the description hereinafter.

It has now been found that the residual cobalt content of the decobalter effluent is a function of and is closely associated with the water content of the feed from the primary carbonylation reactor to the decobalter. It has been found that when the water content of the feed to the decobalter is much greater than about 1%, the soluble cobalt content of the decobalter effluent, after heat treatment at a temperature even up to about 350°–400° F. in the presence of hydrogen, is excessive, and this cobalt subsequently is decomposed in the furnace coils and in the subsequent high pressure hydrogenator. The inventor has found that among the secondary reaction products produced in the primary carbonylation zone and in the decobalter, there is produced a significant amount of cobalt formate, a material considerably more stable to heat than cobalt carbonyl. The effect of water may be to solubilize the formate in the primary reaction product solution.

In accordance with the present invention, therefore, the feed from the primary carbonylation reactor to the decobalter is treated in such a manner that its water content is maintained at less than 1%, preferably on the order of 0.5%. This may be accomplished by such means as inserting a water trap in the line prior to the decobalter, or by passing the decobalter feed through conventional drying agents, such as alumina, various clays, etc., or by a combination of such treatments.

Though in accordance with the invention the water content of the feed to the decobalter is maintained at less than about 1%, it has been shown that under certain circumstances it may be desirable actually to add water to the carbonylation reactor system. Thus, it has been shown that controlled addition of water with the feed to the reactor when propylene is the olefin being converted results in increased butyl alcohol selectivity. Also, it may be desirable to add water to the reactor system to repress acetal formation. In accordance with the present invention, therefore, water may be reintroduced into the reactor system at a point subsequent to the decobalting step. Thus, water in concentrations of from 2–10% by volume may, if desired, be introduced in the hydrogenation stage, to aid in the suppression of acetal formation and increase the overall selectivity to alcohol.

The present invention and its application will best be understood from the more detailed description hereinafter, wherein reference will be made to the accompanying drawing, which is a schematic representation of a system suitable for carrying out a preferred embodiment of the invention.

Referring now to the Figure 1, an olefinic hydrocarbon having one carbon atom less than the number of carbon atoms in the desired resulting oxygenated compound and containing dissolved a catalyst promoting the reaction of olefinic compounds with carbon monoxide and hydrogen to form oxygenated organic compounds is fed to the lower portion of primary reactor 1 through feed line 2. Any conventional type catalyst such as cobalt stearate, naphthenate, oleate, iron linoleate, etc. may be used. Catalyst makeup dissolved in olefin feed may be added to the main olefin feed line 2 through line 3. The concentrations of catalyst and the proportions of the catalyst-containing feed to the non-catalyst containing feed are such that the concentration of catalyst in the total olefin feed varies between 0.1 to 5.0% by weight, preferably about 1–3% by weight of catalyst salt to olefin.

Simultaneously, a gas mixture containing hydrogen and carbon monoxide in the approximate ratio of 0.5 to 2.0 volumes of hydrogen per volume of carbon monoxide is supplied through line 4 and is fed to primary reactor 1. Reactor 1 is preferably operated at about 3000 p. s. i. g. and at a temperature of from about 250° to 400° F. The reactor may contain no packing, or may be packed with catalytically inert solid material, as ceramic rings, pumice and the like.

Reactor 1 is preferably operated at a temperature of from about 250°–400° F., depending upon the nature of the olefin feed and other reaction conditions. The rate of flow of synthesis gases and olefins through reactor 1 is so regulated that the desired conversion level of the olefinic material is obtained.

A mixture of liquid oxygenated reaction products containing in solution unreacted olefins, dissolved catalyst and unreacted synthesis gases is withdrawn overhead from reactor 1 and is transferred through line 8, and cooler 10, and line 12, to high pressure separator 14, where unreacted gases are withdrawn overhead through line 16, scrubbed in scrubber 18 of entrained liquid, and used in any way desired. They may be recycled to synthesis gas feed line 4 via line 20 for use in adjusting the desired H₂ partial pressure and for adjusting the $H_2/CO$ ratio in the feed to reactor 1. If desired, only a part of the gases from separator 14 may be thus employed. The balance may be urged from the system through line 22.

A stream of liquid mixture comprising primary reaction product, unconverted olefins, and containing relatively high concentrations of cobalt carbonyl as well as other cobalt compounds and complexes, and which may contain up to 2–3% water, is withdrawn from separator 14 through line 24. A portion of said withdrawn stream may be recycled, if desired, to reactor 1 via line 26 to aid in the cooling and maintenance of temperature control of the primary carbonylation stage. The balance of the primary reaction product may be withdrawn through line 28 and passed in accordance with the present reaction, to parallel drying towers 30. These towers may be provided with dehydrating materials that do not react with the aldehydes present in the feed, such as alumina, silica gel and clays, etc. The towers are preferably heated by closed steam lines 32. The towers are also equipped with inert gas lines, wherein stripping gases such as nitrogen or natural gas, may be injected to remove water from wetted drying agent. The parallel drying towers are employed such that wet feed may be switched and drying agent regenerated when the capacity of a single tower is reduced. The tower during the drying operation is kept at a temperature level of 50° to 100° F. and the rate of product flow through tower 30 is about 0.5 to 5 v./v./hr.

The effluent from tower 30, which now contains less than about 1% water, and preferably no more than about 0.5%, is passed to catalyst removal or decobalting zone 38 via line 36, wherein by suitable heat treatment at about 300°–400° F., the dissolved cobalt carbonyl is decomposed to the metal. A stream of hydrogen comprising gas may be admitted to zone 38 through line 40 to aid in stripping and removing the CO resulting from the decomposition of the metal carbonyl. Zone 38 may be operated at high pressures, though preferably pressures are in the range of about 15–200 p. s. i. g. The gas stream comprising $H_2$ and CO may be removed from zone 38 through line 42 and used in any manner desired, such as being sent to a catalytic reduction zone where CO is reduced to $CH_4$, and the mixture may then be used for subsequent hydrogenation or as purge gas.

As a result of the dehydration step followed by the decobalting process, not only is the cobalt carbonyl substantially completely converted to cobalt metal and carbon monoxide, but also cobalt salts, such as cobalt formate, which are not decomposed by the heat treatment, are substantially completely removed from solution, and are suspended or precipitated in the decobalter. The liquid product from the decobalter, which may carry in suspension precipitated finely divided cobalt metal and the aforementioned salts, is withdrawn from decobalter 38 through line 44 and may be passed through filter 46 for removal of suspended solids. Sludge may be removed from decobalter 38 through line 41.

The liquid carbonylation reaction product now substantially completely free of dissolved and suspended catalyst is withdrawn from filter 46 through line 48 and passed to the lower portion of hydrogenator 50. Simultaneously, hydrogen is supplied to reactor 50 through line 52 in proportions sufficient to convert the organic carbonyl compounds in the oxygenated feed into the corresponding alcohols. Hydrogenator 50 may contain a mass of any conventional hydrogenation catalyst, such as nickel, copper chromite, cobalt, sulfactive catalysts of the type of oxides and sulfides of tungsten, nickel, molybdenum and the like, either as such or supported on a carrier. Depending upon the catalyst, reactor 50 may be operated at pressures from 2500–4500 p. s. i. g. and at temperatures of from about 300°–500° F. and an $H_2$ feed rate of from about 5000 to 20,000 normal cubic feet per barrel of feed.

The products of the hydrogenation reaction may be withdrawn overhead through line 54, then through cooler 56 into high pressure separator 58, where unreacted hydrogen may be withdrawn overhead through line 60 for further use in the system, if desired. Liquid products are withdrawn from separator 58 through line 62 and passed to hydrocarbon still 64, where low-boiling products, mostly hydrocarbons boiling below the alcohol product desired are distilled overhead. Thus, when $C_7$ olefin fraction is the feed to the carbonylation reactor, generally the product boiling up to 340° F. is removed as a heads cut in hydrocarbon still 64. This material may be withdrawn overhead through line 66 and may be used as a gasoline blending agent. The bottoms from this primary distillate are withdrawn from still 64 and sent through line 68 to alcohol still 70 where product alcohols boiling in the desired range may be removed overhead by distillates at atmospheric or reduced pressure, depending upon their molecular weight. The bottoms from this distillation may be further processed or, if desired, may be used as fuel.

The system illustrated in the drawing and in the foregoing description permits of various modifications without departure from the spirit of the invention. Thus, as already previously indicated, it may under certain circumstances, be desirable to add water to the reaction system either prior to or subsequent to its removal just preceding the decobalting operation. In some cases it may even be desirable to add water both prior to and subsequent to the decobalting. This water may be added in amounts less than, equal to, or even greater than, the amount of water removed in tower 38.

Another preferred and even simpler method of removing water from the decobalter feed is shown in Figure 2. Decobalter feed from the carbonylation reactor is passed through line 80 to water trap 82. If desired, this may be provided with a heating coil. The flow rate of primary reaction product through 82 is sufficiently slow to permit formation of lower water layer, which may be withdrawn through line 84, while the upper layer, containing less than 1% of water, may be passed through line 86 to the decobalter. Under certain circumstances, as when the feed contains substantial quantities of water, it may be desirable to employ a combination of trap 82 with tower 38. The employment of the water trap prior to passing the primary product to the decobalter has the added advantage that the heat-stable water-soluble secondary reaction compounds formed in the primary reactor are substantially removed prior to passage through the decobalter, reducing the load on the subsequent filtration operation. It may also be desirable, if formic acid is present in large amounts, even to add water to the decobalter feed through line 88 prior to its removal in trap 82.

The invention may be further illustrated by the following example which points out the advantages obtained when operating in accordance with the present invention.

EXAMPLE

The effect of water in the stream to the decobalter is clearly shown in the table below, taken from the data of a semi-commercial (100 barrel per stream day) plant, processing a $C_7$ olefin to convert the same to iso-octyl aldehyde and alcohol. The product stream from the primary carbonylation reactor and separators, operated essentially as described above, was analyzed for water. In columns A and B, water was not removed prior to decobalting, whereas water was removed, in accordance with the present invention, in the data shown in columns C and D.

*Effect of water removal on decobalting—100 B./D. plant-run 100-71*

|  | A | B | C | D |
|---|---|---|---|---|
| Run Hour | 26 | 98 | 198 | 272 |
| Olefin Feed Rate, B./S./D. | 101 | 126 | 57 | 108 |
| Cobalt in Feed, Wt. Percent | 0.11 | 0.25 | 0.17 | 0.26 |
| Water Removed From Decobalter Feed, G. P. H. | None | None | 1 | ½ |
| G. P. H./Barrel Olefin Feed | | | 0.42 | 0.11 |
| Olefin Conversion, Mol. Percent | 69 | 70 | 77 | 77 |
| Water in Decobalter Feed, Wt. Percent | (1) | (1) | 0.34 | 1.10 |
| Soluble Cobalt in Decobalter Product, Wt. Percent | 0.014 | 0.049 | 0.0001 | 0.002 |
| Formic Acid, Percent in: | | | | |
| Decobalter Feed | | | 0.39 | 0.32 |
| Decobalter Product | | | 0.19 | 0.42 |
| H₂O From Trap Before Decobalter | | | 0.68 | 0.42 |

[1] Greater than 1%.

These data show clearly that when water is not removed from the decobalter feed, soluble cobalt is found in the decobalter effluent in amounts far beyond the critical limits, which means fouling of the furnace lines and catalyst inactivation. The soluble cobalt content increases with the time on stream, that is, as the decobalter loses its efficiency (column B). However, when the water is removed prior to decobalting, the amount of soluble cobalt found in the effluent rapidly decreases. Column D indicates that when the water content is reduced to 1.1%, the cobalt in the effluent decreases to 0.002%, while when the water in the decobalter feed is reduced to 0.34%, the soluble cobalt is in turn reduced to 0.0001%, even after the decobalter has been on stream for about 200 hours and longer.

It is of further interest to note that formic acid, which appears to be one of the secondary reaction products formed, occurs to about an equal extent in the feed to the decobalter in periods C and D. However, by the more extensive removal of water (column C) the formic acid content of the decobalter effluent was less than half of that present in run D. Since cobalt formate is found in the effluent, this removal of formic acid is of considerable significance.

What is claimed is:

1. In a continuous carbonylation process wherein olefinic compounds, carbon monoxide and hydrogen are contacted with a cobalt carbonylation catalyst in a carbonylation zone under conditions to produce aldehydes containing one more carbon atom per molecule than said olefinic compounds, and whereby minor amounts of secondary reaction products including water and cobalt formate are formed, and wherein a liquid reaction product comprising said aldehydes and dissolved cobalt carbonyls and cobalt formate are passed to a catalyst decomposition zone wherein cobalt carbonyl is decomposed under the influence of heat to cobalt metal and carbon monoxide, the improvement which comprises passing said liquid reaction product prior to its passage to said catalyst decomposition zone through a water removal zone wherein the water content of said product is decreased to less than about 1% of said product, whereby the cobalt formate is removed from solution.

2. An improved process for preparing oxygenated organic compounds from olefins which comprises passing an olefin, carbon monoxide and hydrogen into a carbonylation zone in contact with a cobalt carbonylation catalyst, forming aldehydes containing one more carbon atom than said olefins in said zone, forming minor amounts of secondary reaction products including water and cobalt formate in said zone, passing a liquid product comprising aldehydes, water, unreacted olefins, secondary reaction products including cobalt formate and dissolved cobalt compounds and complexes from said carbonylation zone, passing said product through a water removal zone, whereby said cobalt formate is rendered insoluble in said aldehyde product, passing product containing only a minor amount of water into a catalyst decomposition zone, subjecting said product in said zone to a heat treatment in the presence of an inert stripping gas to decompose substantially all dissolved cobalt carbonyl in said liquid product to cobalt metal, and recovering a product substantially free of dissolved cobalt compounds.

3. The process of claim 2 wherein the liquid product withdrawn from said water removal zone and passed to said catalyst decomposition zone contains less than about 1% water by weight.

4. The process of claim 3 wherein said water content is about 0.5% by weight.

5. The process of claim 2 wherein water is added externally to said liquid product prior to its passage through said water removal zone.

6. The process of claim 2 wherein said last-named product is hydrogenated to alcohols in a hydrogenation zone and wherein an amount of water at least equivalent to said removed water is added to said hydrogenation zone.

JOSEPH K. MERTZWEILLER.

References Cited in the file of this patent

UNITED STATES PATENTS

| Number | Name | Date |
|---|---|---|
| 1,724,761 | Holden | Aug. 13, 1929 |

OTHER REFERENCES

Ruhrchemie Aktiengesellschaft (German Patent Application) "Process for the Catalytic Addition of Water Gas to Olefins" R 655 T. O. M. Reel 36 (2 pages spec.). Deposited in Library of Congress, April 18, 1946. (Available in Meyer Translation.)

Fiat Final Report 1000 PB-81383, December 26, 1946, pages 11-19 and 34.